(12) United States Patent
Hansen

(10) Patent No.: US 8,960,703 B1
(45) Date of Patent: Feb. 24, 2015

(54) TRAILER SAFETY ASSEMBLY

(71) Applicant: Roy A. Hansen, Fort Collins, CO (US)

(72) Inventor: Roy A. Hansen, Fort Collins, CO (US)

( * ) Notice: Subject to any disclaimer, the term of this patent is extended or adjusted under 35 U.S.C. 154(b) by 0 days.

(21) Appl. No.: 14/074,113

(22) Filed: Nov. 7, 2013

(51) Int. Cl.
*B62D 53/08* (2006.01)
*B60D 1/30* (2006.01)
*B60D 1/01* (2006.01)

(52) U.S. Cl.
CPC . *B60D 1/30* (2013.01); *B60D 1/015* (2013.01)
USPC .......................................................... 280/432

(58) Field of Classification Search
CPC ........................ B62D 53/0871; B62D 53/0878
USPC ................................ 280/432, 433, 455.1, 457
See application file for complete search history.

(56) References Cited

U.S. PATENT DOCUMENTS

| | | | | |
|---|---|---|---|---|
| 2,146,145 | A * | 2/1939 | Huffman et al. .............. | 280/432 |
| 2,528,076 | A | 10/1950 | Plaxco | |
| 2,962,301 | A * | 11/1960 | Washington .................. | 280/432 |
| 3,030,125 | A | 4/1962 | Braunberger | |
| 3,063,739 | A * | 11/1962 | Davies ........................ | 280/441.1 |
| 3,328,051 | A * | 6/1967 | Hope et al. .................... | 280/432 |
| 3,353,841 | A | 11/1967 | Neal | |
| 3,751,070 | A * | 8/1973 | Schaffart et al. .............. | 280/432 |
| 3,837,678 | A * | 9/1974 | Cicero .......................... | 280/432 |
| 3,874,699 | A | 4/1975 | Hayes et al. | |
| 4,068,860 | A * | 1/1978 | Meyers et al. ................ | 280/432 |
| 4,119,330 | A * | 10/1978 | Capps ........................... | 280/432 |
| 4,120,514 | A * | 10/1978 | Sanders ........................ | 280/432 |
| 4,438,943 | A * | 3/1984 | Hebert .......................... | 280/432 |
| 4,720,118 | A * | 1/1988 | Schultz et al. ................ | 280/432 |
| 4,784,403 | A * | 11/1988 | Hawkins et al. .............. | 280/432 |
| 4,790,556 | A * | 12/1988 | Hawkins et al. .............. | 280/432 |
| 4,934,727 | A * | 6/1990 | Hawkins et al. .............. | 280/432 |
| 5,456,483 | A * | 10/1995 | Madsen et al. ................ | 280/432 |
| 6,260,872 | B1 * | 7/2001 | Budhram ...................... | 280/432 |
| 6,340,167 | B1 * | 1/2002 | Boyd ............................ | 280/432 |
| 6,565,108 | B1 * | 5/2003 | Gearhart ....................... | 280/432 |
| 6,746,035 | B1 * | 6/2004 | Williams et al. .............. | 280/432 |
| 7,156,410 | B1 * | 1/2007 | Maskaleris ................... | 280/432 |
| D560,143 | S | 1/2008 | Crawley et al. | |

* cited by examiner

*Primary Examiner* — Tony H. Winner
*Assistant Examiner* — Gabriela C Craciun

(57) ABSTRACT

A trailer safety assembly for preventing the trailer from jack-knifing includes an actuator coupled to the trailer. The actuator is positioned proximate a king pin on the trailer. A pin is operationally coupled to said actuator. The pin selectively engages a fifth wheel on a vehicle if the trailer begins to jack-knife. An undesired motion of the trailer is restricted.

7 Claims, 5 Drawing Sheets

TRAILER SAFETY ASSEMBLY

BACKGROUND OF THE DISCLOSURE

Field of the Disclosure

The disclosure relates to trailer safety devices and more particularly pertains to a new trailer safety device for preventing the trailer from jack-knifing.

SUMMARY OF THE DISCLOSURE

An embodiment of the disclosure meets the needs presented above by generally comprising an actuator coupled to the trailer. The actuator is positioned proximate a king pin on the trailer. A pin is operationally coupled to said actuator. The pin selectively engages a fifth wheel on a vehicle if the trailer begins to jack-knife. An undesired motion of the trailer is restricted.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
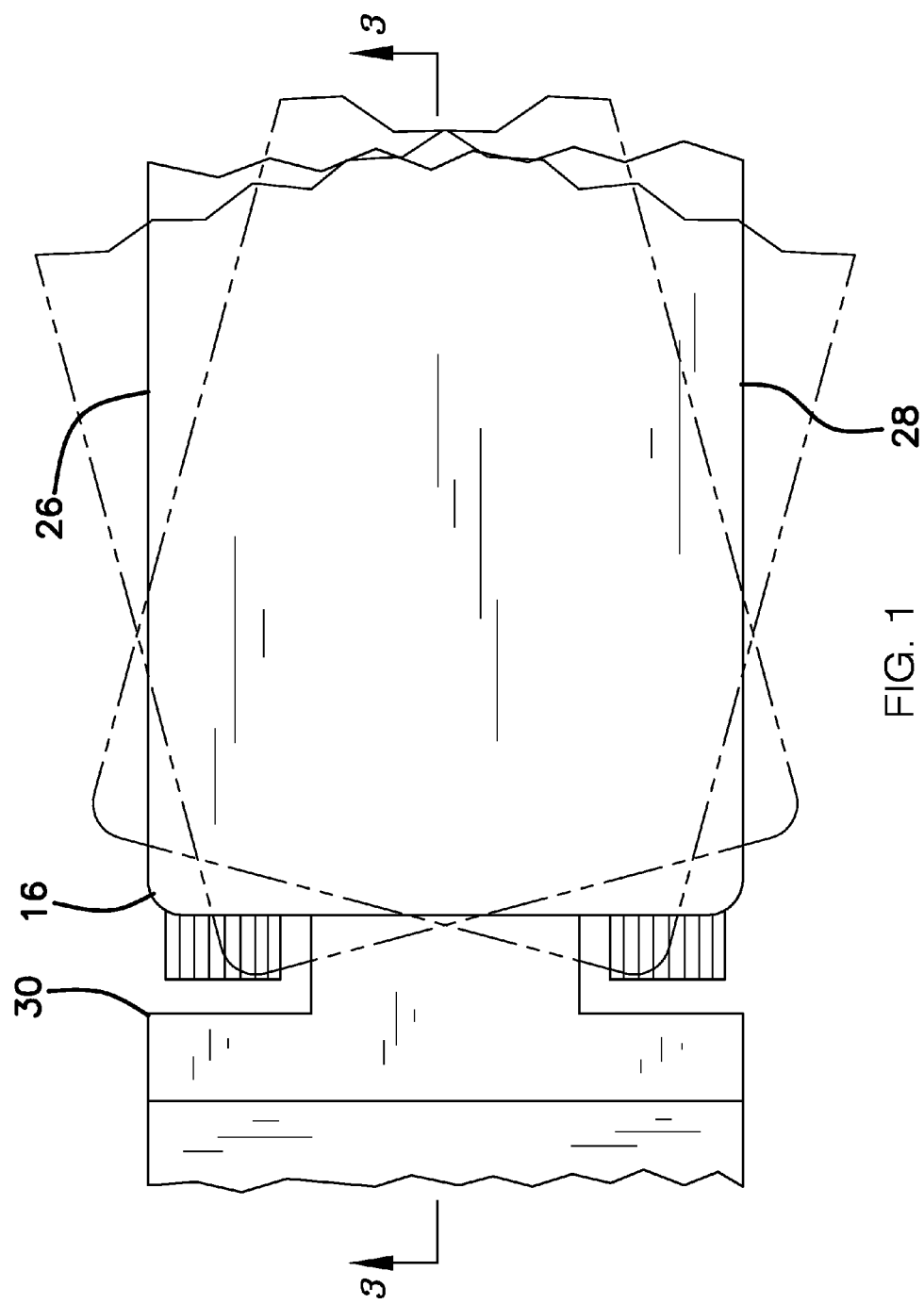
FIG. 1 is a top view of a trailer safety assembly according to an embodiment of the disclosure.
Figure 2:
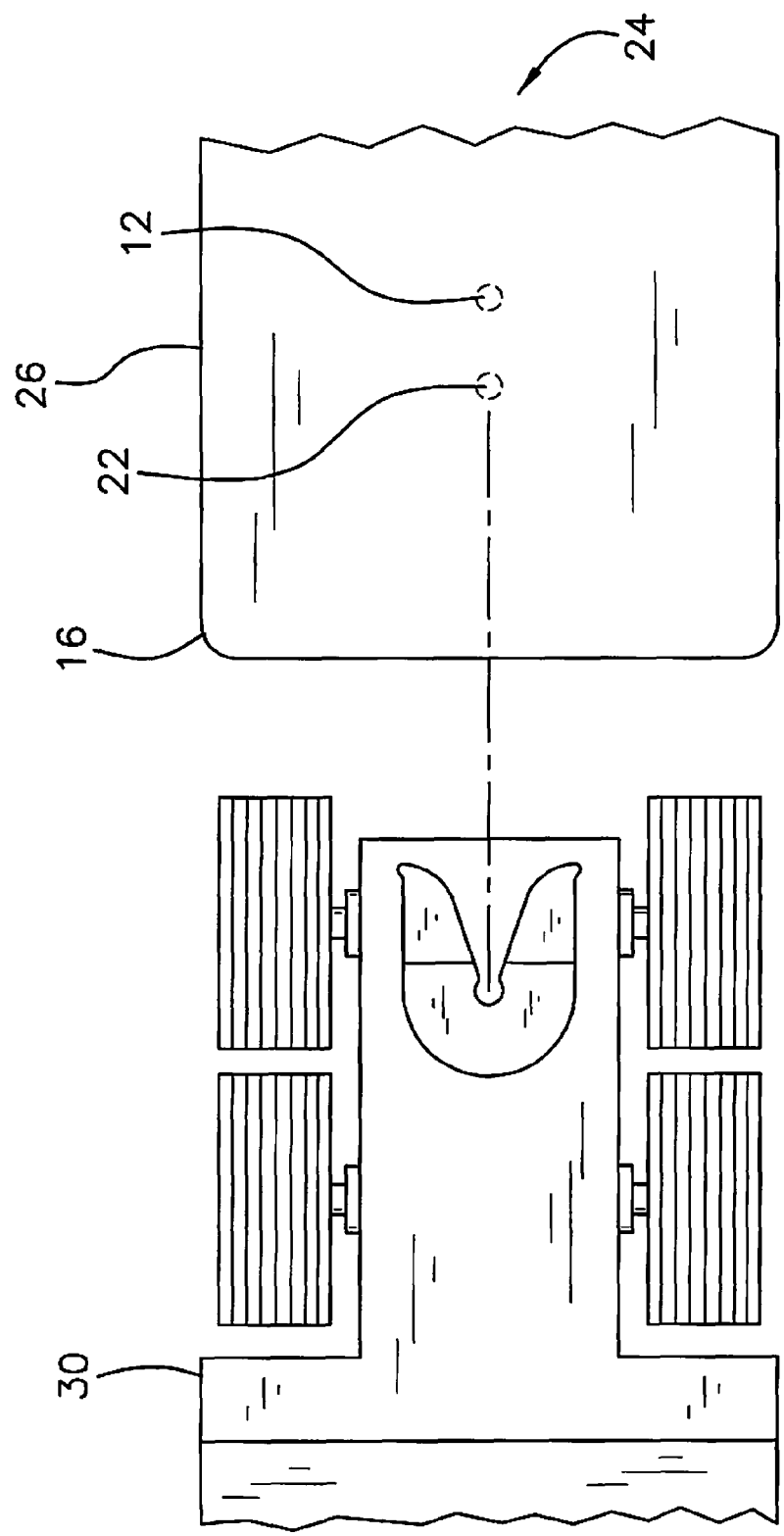
FIG. 2 is a top perspective view of an embodiment of the disclosure.
Figure 3:
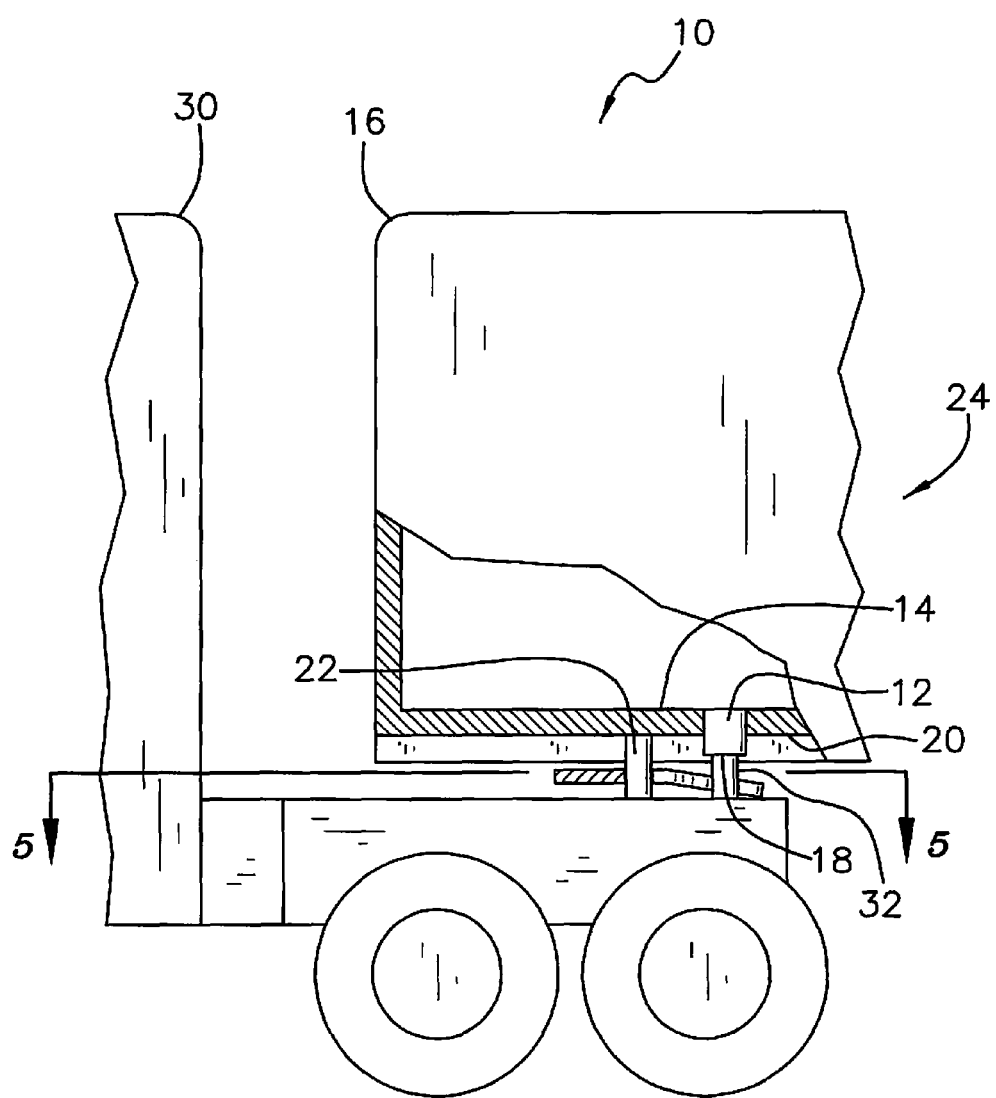
FIG. 3 is a cross sectional view taken along line 3-3 of FIG. 1 of an embodiment of the disclosure.
Figure 4:
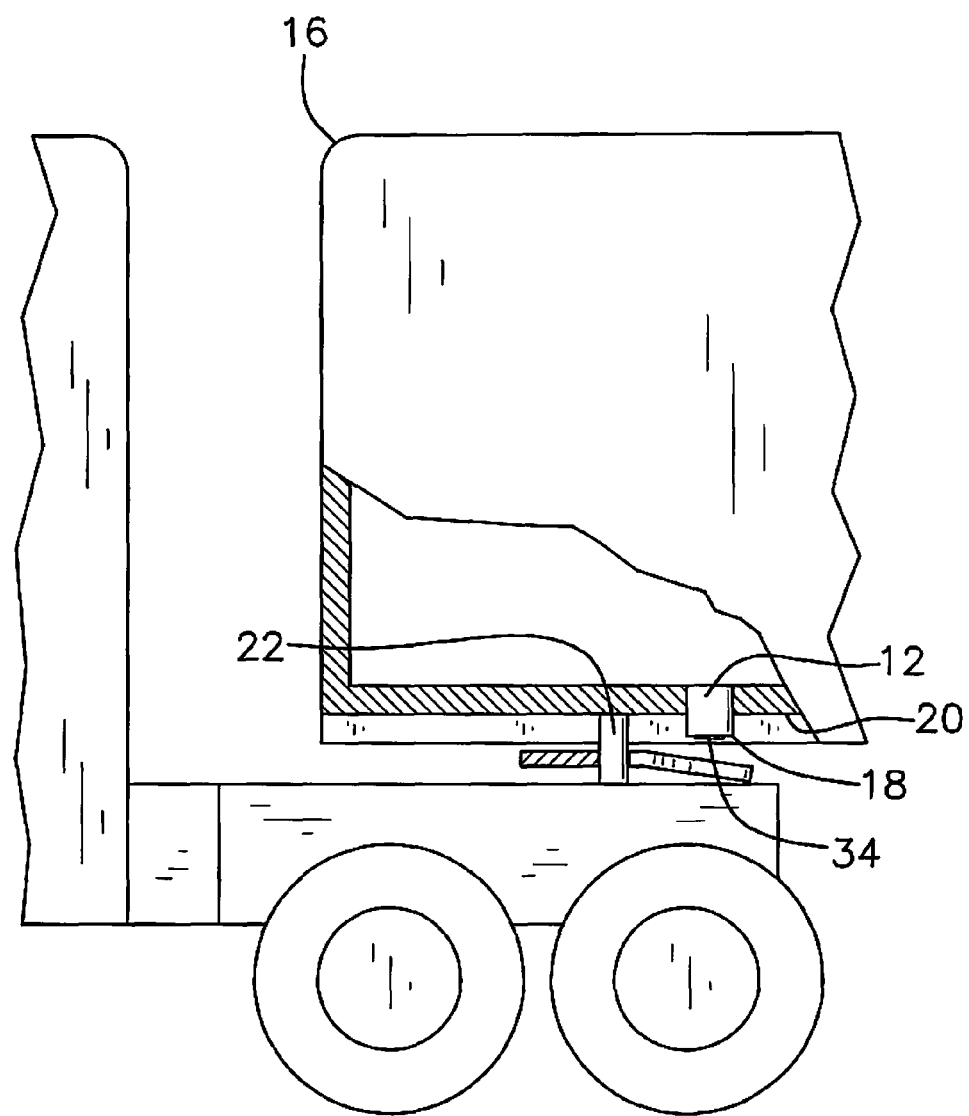
FIG. 4 is a left side view of an embodiment of the disclosure.
Figure 5:
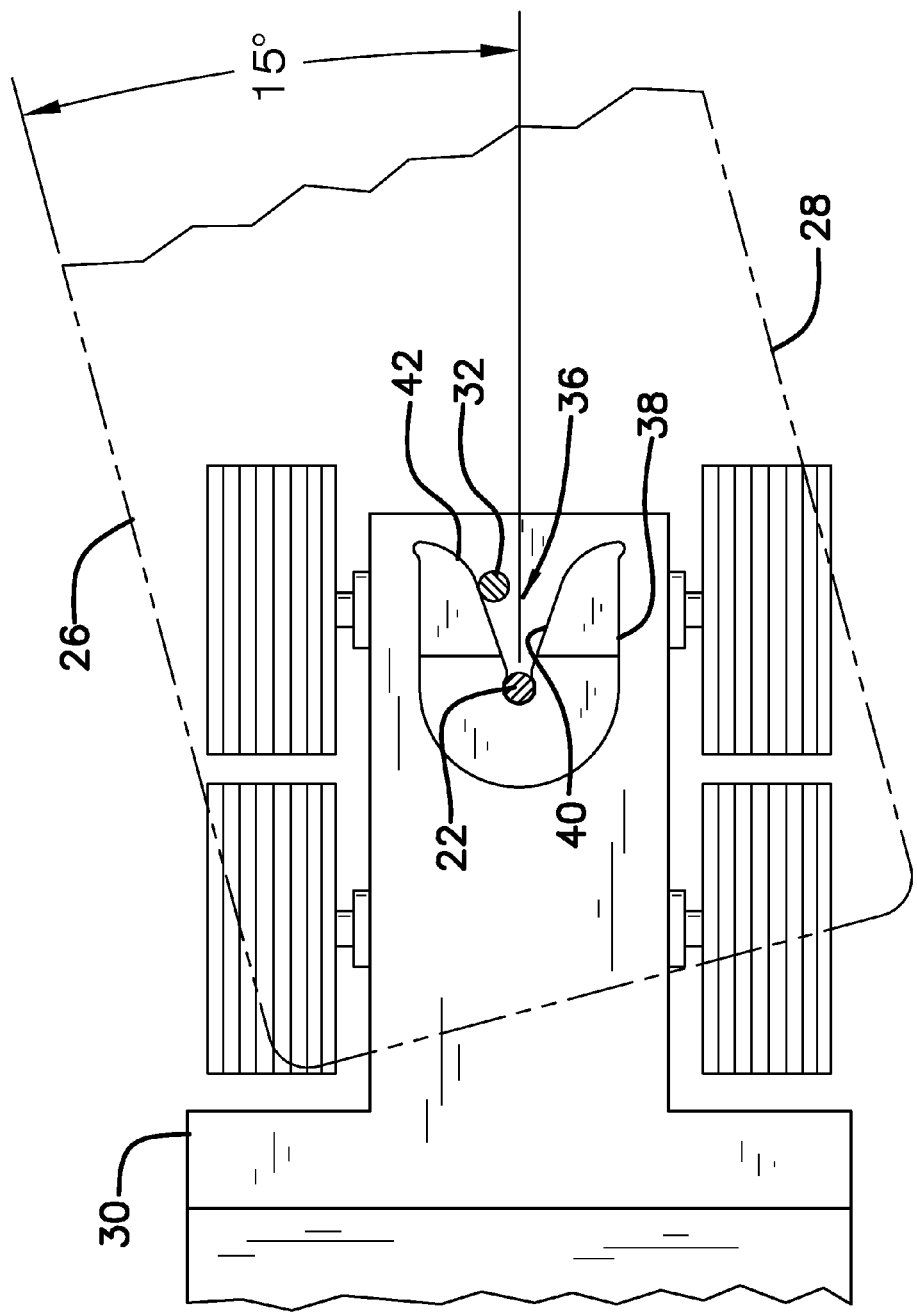
FIG. 5 is a cross sectional view taken along line 5-5 of FIG. 3 of an embodiment of the disclosure.

With reference now to the drawings, and in particular to FIGS. 1 through 5 thereof, a new trailer safety device embodying the principles and concepts of an embodiment of the disclosure and generally designated by the reference numeral 10 will be described.

As best illustrated in FIGS. 1 through 5, the trailer safety assembly 10 generally comprises an actuator 12 coupled to a bottom wall 14 of a trailer 16. The trailer 16 may be a semi trailer of any conventional design. Continuing, the actuator 12 extends upwardly into the bottom wall 14 of the trailer 16. A bottom 18 of the actuator 12 is positioned below a bottom surface 20 of the bottom wall 14 of the trailer 16.

The actuator 12 is positioned closer to a king pin 22 than a rear 24 of the trailer 16. Moreover, the actuator 12 is centrally positioned with respect to a first lateral side 26 and a second lateral side 28 of the trailer 16. The actuator 12 is selectively electrically coupled to a vehicle 30 so the actuator 12 is selectively actuated by a driver of the vehicle 30. Lastly, the vehicle 30 may be a semi truck of any conventional design.

A pin 32 is movably coupled to the actuator 12. The pin 32 is positionable in an extended position when the actuator 12 is actuated. Further, the pin 32 extends downwardly from the bottom 18 of the actuator 12. The pin 32 is additionally positionable in a retracted position when the actuator 12 is de-actuated. Additionally, the pin 32 retracts upwardly into the actuator 12 so a bottom 34 of the pin 32 is positioned proximate the bottom 18 of the actuator 12. Lastly, the pin 32 may have a length between 10 cm and 15 cm.

The actuator 12 is actuated when the trailer 16 is coupled to the vehicle 30. Continuing, the pin 32 extends downwardly into a king pin space 36 in a fifth wheel 38. The pin 32 engages either of a first lateral edge 40 or a second lateral edge 42 of a king pin space 36 in the fifth wheel 38 when the trailer 16 begins to jack-knife. Moreover, the pin 32 restricts a lateral rotation of the trailer 16 when the trailer 16 begins to jack-knife so the trailer 16 is prevented from jack-knifing. The trailer 16 is restricted to 15 degrees of lateral rotation from a longitudinal center line of the vehicle 30.

In use, the actuator 12 is actuated when the trailer 16 is coupled to the vehicle 30. The assembly 10 allows the driver of the vehicle 30 to maintain control of the vehicle 30 and the trailer 16 in the event of a loss of traction that causes the trailer 16 to begin to jack-knife. Additionally, the actuator 12 is de-actuated if the driver needs to allows the trailer 16 to rotate beyond the 15 degree limitation. The driver may actuate and de-actuate the actuator 12 at any time while towing the trailer 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A trailer safety assembly comprising:
    an actuator coupled to a trailer such that said actuator is positioned in a static position relative to and proximate a king pin on the trailer; and
    a pin operationally coupled to said actuator wherein said pin is selectively extendable from said trailer to engage a fifth wheel on a vehicle when the trailer begins to jack-knife wherein an undesired motion of the trailer is restricted, said pin being positionable in an extended position when said actuator is actuated wherein said pin is extended downwardly away from said trailer past a bottom of said actuator to position said pin within a tapered slot of a king pin space of said fifth wheel on said vehicle such that said pin is restricted by opposite edges defining said tapered slot of said king pin space of said fifth wheel and pivoting of said trailer about said king pin relative to said fifth wheel is inhibited, said pin being positionable in a retracted position when said actuator is de-actuated wherein said pin retracts upwardly into said actuator wherein a bottom of said pin is positioned proximate a bottom side of said actuator clear of said fifth wheel.

2. The assembly according to claim 1 further comprising said actuator being coupled to a bottom wall of the trailer wherein said actuator extends upwardly into the bottom wall of the trailer wherein a bottom of said actuator is positioned below a bottom surface of the bottom wall of the trailer.

3. The assembly according to claim 1 further comprising said actuator being positioned closer to the king pin than a rear of the trailer.

4. The assembly according to claim 1 further comprising said pin being centrally positioned with respect to a first lateral side and a second lateral side of the trailer.

5. The assembly according to claim 1 further comprising said actuator being selectively electrically coupled to the vehicle wherein said actuator is configured to be selectively actuated by a driver of the vehicle.

6. The assembly according to claim 1 further comprising said pin being movably coupled to said actuator.

7. A trailer safety assembly for preventing the trailer from jack-knifing, said assembly comprising:

an actuator coupled to a bottom wall of the trailer wherein said actuator extends upwardly into the bottom wall of the trailer wherein a bottom of said actuator is positioned below a bottom surface of the bottom wall of the trailer, said actuator being positioned closer to a king pin than a rear of the trailer, said actuator being statically and centrally positioned with respect to a first lateral side and a second lateral side of the trailer, said actuator being selectively electrically coupled to the vehicle wherein said actuator is selectively actuated by a driver of the vehicle; and a pin movably coupled to said actuator, said pin being positionable in an extended position when said actuator is actuated wherein said pin extends downwardly from said bottom of said actuator, said pin being positionable in a retracted position when said actuator is de-actuated wherein said pin retracts upwardly into said actuator wherein a bottom of said pin is positioned proximate said bottom side of said actuator clear of said fifth wheel, said pin being positionable in said extended position when said actuator is actuated wherein said pin is extended downwardly away from said trailer past a bottom of said actuator to position said pin within a tapered slot of a king pin space of said fifth wheel on said vehicle such that said pin is restricted by opposite edges defining said tapered slot of said king pin space of said fifth wheel and pivoting of said trailer about said king pin relative to said fifth wheel is inhibited.

\* \* \* \* \*